United States Patent
Gordon et al.

(10) Patent No.: US 10,162,973 B2
(45) Date of Patent: Dec. 25, 2018

(54) DYNAMICALLY PROVISIONING VIRTUAL MACHINES

(71) Applicant: International Business Machines Corporation, Armonk, NY (US)

(72) Inventors: Itai Gordon, Modiin (IL); Peter Hagelund, Princeton, NJ (US); Ilan D. Prager, Beit Shemesh (IL)

(73) Assignee: International Business Machines Corporation, Armonk, NY (US)

( * ) Notice: Subject to any disclaimer, the term of this patent is extended or adjusted under 35 U.S.C. 154(b) by 178 days.

(21) Appl. No.: 15/194,865

(22) Filed: Jun. 28, 2016

(65) Prior Publication Data
US 2017/0372080 A1   Dec. 28, 2017

(51) Int. Cl.
G06F 21/60 (2013.01)
G06F 9/455 (2018.01)
H04L 29/06 (2006.01)

(52) U.S. Cl.
CPC ........ *G06F 21/604* (2013.01); *G06F 9/45558* (2013.01); *H04L 63/102* (2013.01); *G06F 2009/4557* (2013.01); *G06F 2009/45595* (2013.01)

(58) Field of Classification Search
CPC ......... G06F 2009/45558; G06F 21/604; H04L 63/20; H04L 63/102
See application file for complete search history.

(56) References Cited

U.S. PATENT DOCUMENTS

| | | | |
|---|---|---|---|
| 7,603,704 B2 * | 10/2009 | Bruening | G06F 21/52 726/22 |
| 8,595,824 B2 | 11/2013 | Albrecht-Buehler | |
| 8,826,289 B2 | 9/2014 | Muller | |
| 8,849,857 B2 | 9/2014 | Bray et al. | |
| 9,165,150 B2 | 10/2015 | Manmohan et al. | |
| 9,171,171 B1 | 10/2015 | Deb et al. | |
| 9,230,096 B2 | 1/2016 | Sarin et al. | |
| 2007/0094471 A1 * | 4/2007 | Shaath | G06F 12/1466 711/163 |
| 2010/0057911 A1 * | 3/2010 | Soppet | G06F 9/546 709/226 |
| 2011/0113467 A1 * | 5/2011 | Agarwal | G06F 21/6281 726/1 |

(Continued)

OTHER PUBLICATIONS

Kumaresan; "Key Considerations in Protecting Sensitive Data Leakage Using Data Loss Prevention Tools"; ISACA Journal; 2014; pp. 1-5; vol. 1.

(Continued)

*Primary Examiner* — Dao Q Ho
(74) *Attorney, Agent, or Firm* — Alexa L. Ashworth; A. Imtiaz Billlah; Brian M. Restauro

(57) ABSTRACT

Embodiments of the present invention disclose methods and systems which receive a user credential corresponding to a user, a task to be performed by the user, a security policy including a user role, and sensitive information. These methods and systems dynamically provision virtual machines including un-redacted information from received sensitive information. Furthermore, a set of tools process the redacted information, based on the user credential, the task to be performed, and the security policy.

17 Claims, 6 Drawing Sheets

(56) References Cited

U.S. PATENT DOCUMENTS

2012/0240114 A1* 9/2012 Muller .................. G06F 9/5027
718/1
2014/0123307 A1* 5/2014 Jung .................. H04L 41/5054
726/27

OTHER PUBLICATIONS

Mell et al.; "The NIST Definition of Cloud Computing"; Special Publication 800-145; Sep. 2011; 7 pages.

* cited by examiner

DYNAMICALLY PROVISIONING VIRTUAL MACHINES

BACKGROUND

The present invention relates generally to virtual machines, and more specifically to dynamically provisioning virtual machines.

Organizations have a substantial amount of sensitive data and tools that any number of workers and external service providers may work with. Thus, there is an increasing risk of sensitive data and tools being accessed by unauthorized individuals. For example, an insurance company may send healthcare insurance claim details to an external doctor. The external doctor may use the sensitive data and the internal tools of the insurance company, in order to perform one or more tasks. Thus, the insurance company may send the sensitive data and tools in emails and create the report on the external doctor's computing device. However, such a system may lead to unauthorized access of sensitive data or internal tools.

SUMMARY

According to an embodiment described herein, a method can include receiving, via a processor, a user credential corresponding to a user, a task to be performed by the user, a security policy including a user role, and sensitive information. The method can further include dynamically provisioning, via the processor, a virtual machine including un-redacted information from the sensitive information and a set of tools for processing redacted the information based on the user credential, the task to be performed, and the security policy.

According to another embodiment described herein, a computer system can include a processor to receive a user credential corresponding to a user, a task to be performed by the user, a security policy including a user role, and sensitive information. The processor can also further dynamically provision a virtual machine including un-redacted information and a set of tools for processing the un-redacted the information based on the user credential, the task to be performed, and the security policy.

According to another embodiment described herein, a computer program product for dynamically provisioning virtual machines can include computer-readable storage medium having program code embodied therewith. The computer readable storage medium is not a transitory signal per se. The program code can be executable by a processor to cause the processor to receive a user credential corresponding to a user, a task to be performed by the user, a security policy including a user role, and sensitive information. The program code can also cause the processor to dynamically provision a virtual machine including un-redacted information from the sensitive information and a set of tools for processing the un-redacted the information based on the user credential, the task to be performed, and the security policy. The program code can also cause the processor to dynamically provision at least one additional virtual machine and restrict a transfer of files between the virtual machine and the at least one additional virtual machine based on the tools of each virtual machine and the security policy.

DETAILED DESCRIPTION

Figure 1:
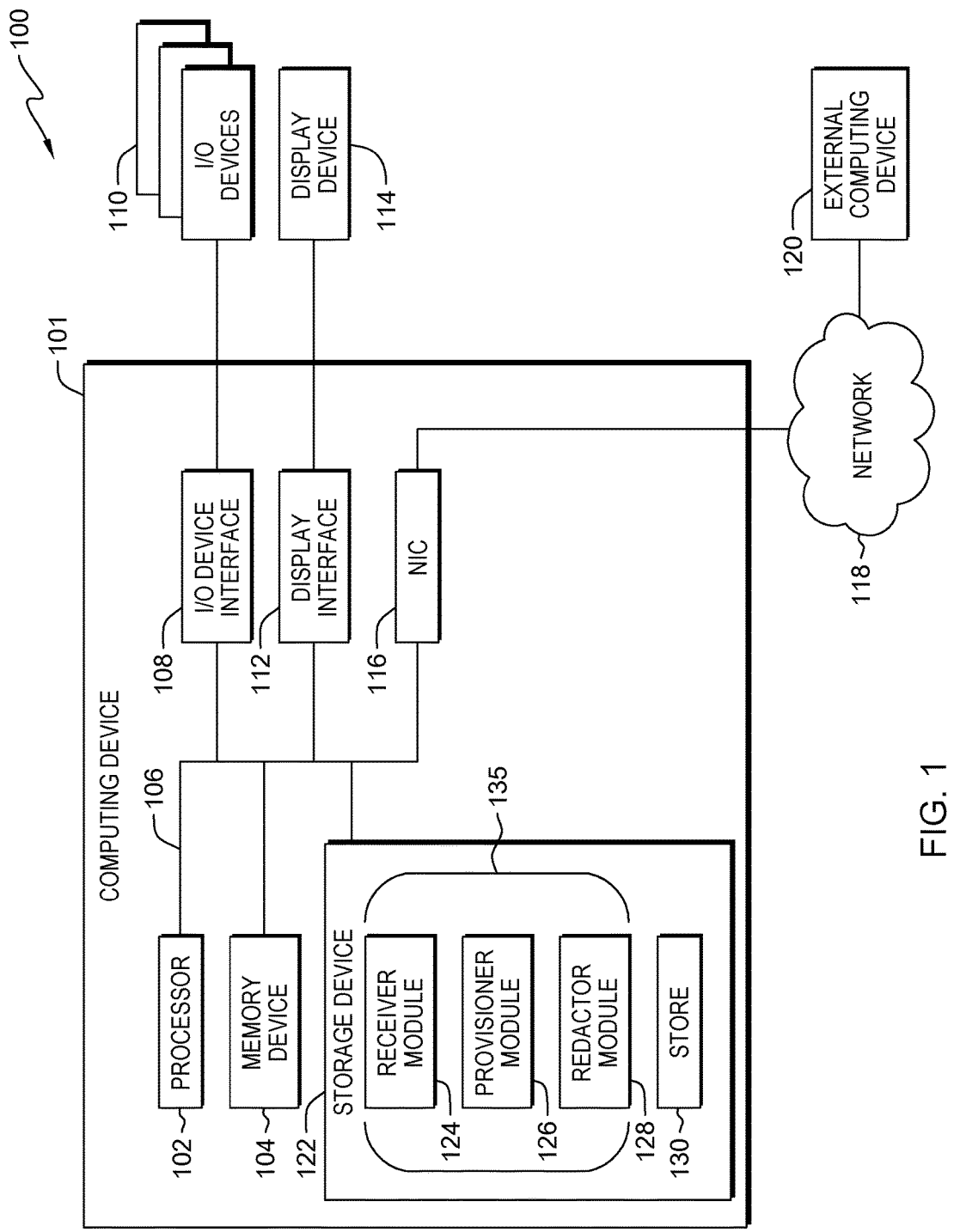
FIG. 1 is a block diagram of an example computing device which dynamically provisions virtual machines, in accordance with an embodiment of the present invention.

According to embodiments of the present disclosure, a computing system can dynamically provision virtual machines. For example, the system receives a user credential corresponding to a user, a task to be performed by the user, a security policy including the user role, and sensitive information. A user role, as used herein, refers to a set of file access permissions associated with a user. A security policy, as used herein, may refer to rules which determine the documents associated with the sensitive information each user may access, and which tools and data may be used for each task. The security policy may also contain which actions may be performed on each document and on each tool. For each task, the security policy may indicate the actions which a user may perform in order to complete the task and the order in which the actions are performed. For example, the actions may include: editing an image, reading a particular file type, sending emails, etc. The security policy may also contain: rules specifying which documents may not be displayed together, and the results of multiple documents, which may not be displayed together being considered to be used together in order to complete a task. For example, the multiple documents may be all redacted, or may be retrieved one-by-one, among other suitable solutions. In some examples, the system can dynamically provision a virtual machine including un-redacted information from received sensitive information and a set of tools for processing the redacted information, based on the user credential, the task to be performed, and the security policy. As used herein, un-redacted information refers to portions of sensitive information that has not been censored or removed. As used herein, redacted information refers to a subset of sensitive information that has been removed or censored. For example, a virtual machine may be provisioned for each task that a particular user may be assigned. In some examples, the techniques may dynamically provision at least one additional virtual machine and restrict a transfer of files between the virtual machine and the at least one additional virtual machine based on the tools of each virtual machine and the security policy. For example, some files may be allowed to be transferred between virtual machines, while other files may be restricted from being transferred between virtual machines. Thus, embodiments of the present disclosure reduce the risk of unauthorized access to sensitive data and tools. For example, for each task to be performed by a particular user, portions of sensitive data to be used for the task can be identified and the rest of the sensitive data may be redacted. Thus, users may not be exposed to sensitive data which is redacted. Furthermore, a virtual machine may be provisioned for each task such that the tools to be used for each task are included and other tools are left out. Thus, unauthorized access to internal tools may be accordingly prevented.

In some embodiments, the techniques described herein may be implemented in a cloud computing environment. As discussed in more detail below in reference to at least FIGS. 1, 4, and 5, a computing device configured to dynamically provision virtual machines may be implemented in a cloud computing environment. It is understood in advance that although this disclosure may include a description on cloud computing, implementation of the teachings recited herein are not limited to a cloud computing environment. Rather, embodiments of the present invention are capable of being implemented in conjunction with any other type of computing environment now known or later developed.

With reference now to FIG. 1, an example computing device can dynamically provision virtual machines. The computing device 101 may be for example, a server, desktop computer, laptop computer, tablet computer, or smartphone. In some examples, computing device 101 may be a cloud computing node. Computing device 101 may be described in the general context of computer system executable instructions, such as program modules, being executed by a computer system. Generally, program modules may include routines, programs, objects, components, logic, data structures, and so on that perform particular tasks or implement particular abstract data types. Computing device 101 may be practiced in distributed cloud computing environments where tasks are performed by remote processing devices that are linked through a communications network. In a distributed cloud computing environment, program modules may be located in both local and remote computer system storage media including memory storage devices.

Computing device 101 may include processor 102 to execute stored instructions, and memory device 104 to provide temporary memory space for operations of said instructions during the execution of an operation. The processor can be a single-core processor, multi-core processor, computing cluster, or any number of other configurations. The memory device 104 can include random access memory (RAM), read only memory, flash memory, or any other suitable memory systems.

Processor 102 may be connected through a system interconnect 106 (e.g., PCI®, PCI-Express®, etc.) to input/output (I/O) device interface 108 adapted to connect computing device 101 to one or more I/O devices 110. I/O devices 110 may include, for example, a keyboard and a pointing device, wherein the pointing device may include a touchpad or a touchscreen, among others. I/O devices 110 may be built-in components of computing device 101, or may be devices that are externally connected to computing device 101.

Processor 102 may also be linked through system interconnect 106 to display interface 112 adapted to connect computing device 101 to display device 114. Display device 114 may include a display screen which is a built-in component of computing device 101. Display device 114 may also include a computer monitor, television, or projector, among others, which is externally connected to computing device 101. In addition, network interface controller (NIC) 116 may be adapted to connect computing device 101 through system interconnect 106 to network 118. In some embodiments, NIC 116 may transmit data using any suitable interface or protocol, such as the Internet small computer system interface. Network 118 may be a cellular network, a radio network, a wide area network (WAN), a local area network (LAN), or the Internet, among others. External computing device 120 may be connected to computing device 101 through network 118. In some examples, external computing device 120 may be an external webserver. In some examples, external computing device 120 may be a cloud computing node.

Processor 102 may also be linked through system interconnect 106 to storage device 122 which includes a hard drive, an optical drive, a USB flash drive, an array of drives, or any combinations thereof. In some examples, the storage device may include receiver module 124, provisioner module 126, and redactor module 128. Receiver module 124, provisioner module 126, and redactor module 128 are components of computing system 135. Receiver module 124 may receive a user credential corresponding to a user, a task to be performed by the user, a security policy comprising a user role, and sensitive information. Provisioner module 126 may dynamically provision a virtual machine including un-redacted information and a set of tools for processing the un-redacted information based on the user credential, the task to be performed, and the security policy. For example, the un-redacted information may include one or more documents with any number of portions therein masked. In some examples, provisioner module 126 may dynamically provision at least one additional virtual machine and restrict a transfer of files between the virtual machine and the at least one additional virtual machine based on the tools of each virtual machine and the security policy. For example, if one virtual machine allows emailing of documents, and another does not allow emailing of documents, then files may not be transferred from the former to the latter virtual machine. In some examples, provisioner module 126 can also provision a restricted user ID for logging onto the virtual machine. Redactor module 128 can redact portions of sensitive information based on the user credential and the request for sensitive information to generate the un-redacted information. For example, any portions of the sensitive information which is not designed to be used for a particular task may be masked or removed. Moreover, any documents that are not to be used for a task may also not be provisioned onto the virtual machine. In some examples, redactor module 128 may recalculate the un-redacted information in one source of data based on un-redacted information in another source of data to be used in the task. For example, based on information shared in one document, another document may have the same information revealed where it may have been previously redacted. In some examples, redactor module 128 can recalculate the un-redacted portions of the sensitive information based on un-redacted portions of sensitive information in another task associated with the user. For example, since the user has already been exposed to the redacted information, the information may be un-redacted. In some examples, redactor module 128 may redact some sensitive information based on detecting that some other information is un-redacted. For example, some types of sensitive information may not be exposed together. Therefore, at least one piece of information of any disallowed combination may be redacted before being provisioned to the user. Provisioner module 126 may then provision an updated virtual machine with updated un-redacted information. Thus, a change in the user, data, or task may lead to a different virtual machine with different data, tools, or user privileges. In some examples, provisioner module 126 may then save actions performed on the virtual machine to a database, stop the virtual machine, and overwrite a virtual machine image corresponding to the virtual machine with randomly generated data. In one instance, the database may be stored onto store 130. In another instance, store 130 may be used to temporarily store data from actions performed on the virtual machines. For example, the data can be deleted after copying the data to a secure database on external computing device 120. By overwriting the virtual machine image with randomly generated data, unauthorized access of sensitive data using data recovery techniques may be prevented.

It is to be understood that the block diagram of FIG. 1 is not intended to indicate that computing device 101 is to include all of the components shown in FIG. 1. Rather, computing device 101 can include fewer or additional components not illustrated in FIG. 1 (e.g., additional memory components, embedded controllers, modules, additional network interfaces, etc.). Furthermore, any of the functionalities of receiver module 124, provisioner module 126, and redactor module 128 may be partially, or entirely, implemented in hardware and/or in processor 102. For example, the functionality may be implemented with an application specific integrated circuit, logic implemented in an embedded controller, or in logic implemented in processor 102, among others. In some embodiments, the functionalities of receiver module 124, provisioner module 126, and redactor module 128 may be implemented with logic, wherein the logic, as referred to herein, can include any suitable hardware (e.g., a processor, among others), software (e.g., an application, among others), firmware, or any suitable combination of hardware, software, and firmware.

Figure 2:
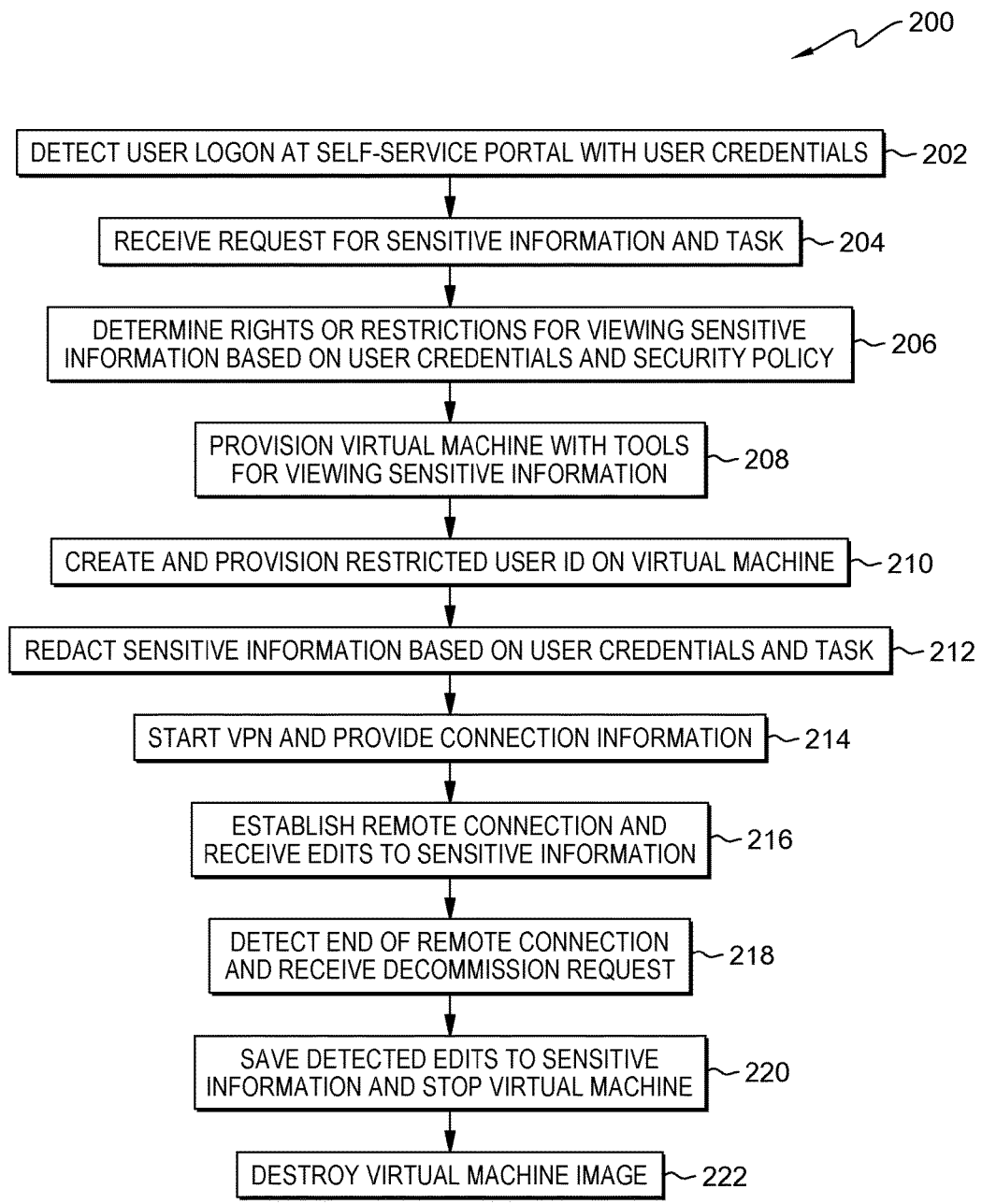
FIG. 2 is a process flow diagram for dynamically provisioning virtual machines, in accordance with an embodiment of the present invention.

FIG. 2 is a process flow diagram of an example detailed process for dynamically provisioning virtual machines. The process 200 can be implemented with any suitable computing device, such as computing device 101 of FIG. 1.

At step 202, computing system 135 detects a user logon at a self-service portal with user credentials. More specifically, receiver module 124 is used to detect and validate user credentials. In some examples, the user credentials may be used to identify the user and determine a role of the user. In some examples, the role of a user may be determined by matching the user credentials with a user role in a security policy.

At step 204, computing system 135 receives a request for sensitive information and a task. The task to be performed are one or more actions to process the sensitive information. For example, the sensitive information may include documents, spreadsheets, images, and the like. The request for sensitive information and the task may also be received via a self-service portal. In some instances, the documents may reside in a location which is inaccessible through a normal network, including any virtual private network (VPN). In some instances, the sensitive information may be encrypted. When a task involves network operations such as surfing the Internet or sending emails, such network operations may be specified through a portal and used to prepare the virtual machine for such operations.

At step 206, computing system 135 determines rights or restrictions for viewing the sensitive information based on the credentials of the user and the security policy. For example, the rights or restrictions may be based on the user role. In some instances, the rights or restrictions may be based on the task to be performed. For example, a task may be performed using some documents and not using other documents included in the sensitive information. In some embodiments, the restrictions can indicate whether a user can view personally identifiable information in a document, or view metadata corresponding to a file, among others. In some examples, other forms of restrictions may be similarly determined. For example, such other restrictions may include restrictions based on the type of data to be processed (e.g., electronic protected health information (ePHI) protected by legislation, credit card data regulated by the Payment Card Industry (PCI), passwords providing access to restricted data or resources, information relating to an ongoing criminal investigations, court-ordered settlement agreements requiring non-disclosure, or information specifically identified by a contract as restricted).

At step 208, computing system 135 provisions a virtual machine with tools for viewing the sensitive information. For example, a particular task may be performed using a particular set of tools. In some examples, these tools to be used for the particular task may be included within the provisioned virtual machine and other tools may be excluded. For example, such tools may include word processors, spreadsheet applications, digital image editors, and document viewing applications, among other suitable tools. In some instances, computing system 135 provisions one or more proxies, firewalls, or any other suitable means for controlling the access of information. In other instances, two or more operations may not be performed on the same virtual machine according to a security policy. For example, some tools may not have Internet access. In this example, computing system 135 may create a number of virtual machines. Each virtual machine may contain tools and data according to a configuration. For example, the configuration may allow the transfer of data from a virtual machine which may send emails, but not allow the transfer of data from a virtual machine which cannot send emails. The user may access the provisioned virtual machines and the tools to move data between the virtual machines.

At step 210, computing system 135 creates and provisions a restricted user ID on the virtual machine. More specifically, provisioner module 126 enables provisioning of a restricted user ID. In some examples, the restricted user ID may have restricted access or privileges within the virtual machine. For example, an account associated with the restricted user ID may not be able to perform administrative system tasks, such as changing system settings, uninstalling or reconfiguring software, or installing additional tools. The restricted user ID may also be used to prevent an associated account from connecting to prohibited locations.

At step 212, computing system 135 redacts the sensitive information based on the user credentials and the task being performed. More specifically, redactor module 128 enables the redaction of the sensitive information. For example, the sensitive information may be retrieved from a secure server and parsed. Any portions of documents in the sensitive information which are not to be used for the task may be redacted. In some instances, computing system 135 may redact documents on the virtual machine or may remove documents that are marked as highly sensitive based on the security policy. In other instances, the un-redacted information from the redacted documents may then be provisioned on the virtual machine.

At step 214, computing system 135 starts the VPN and provides connection information. VPN is used herein to refer to a virtual private network. In some instances, a cloud resource manager may send a request to a hypervisor or virtual machine host to start the virtual machine. For example, the connection information may include information for connecting to the VPN, such as an IP address, port number, etc. In other instances, a host name for the virtual machine may be dynamically created in response to the provisioning of the virtual machine. The connection information can be used by a user to remotely connect to the virtual machine.

At step 216, computing system 135 establishes a remote connection and receives edits to the sensitive information.

For example, the virtual machine may receive a remote screen session request via a virtual private network (VPN) connection. In some instances, remote desktop software on the virtual machine may prohibit the use of a remote clipboard. Thus, the user is prevented from copying or pasting anything to or from the virtual machine. A user may then be allowed to access and work on the redacted documents using the tools provisioned on the virtual machine. For example, the user may work on the redacted documents via a remote client machine using the VPN. In some instances, documents may be edited, created, saved, etc., locally on the virtual machine. In other instances, the documents may be saved externally. For example, when the user finishes a task, the computing device may extract the product of the user work and fill an enterprise content management (ECM) system or a business process management (BPM) system with relevant data and metadata. In some embodiments, the computing device may prevent the documents from being saved remotely or locally on the client machine. In other embodiments, local firewalls on the virtual machine may prevent access to prohibited hosts or ports. In another embodiment, local proxies on the virtual machine may ensure that traffic is routed through the company's or organization's network infrastructure, further imposing restrictions on what can be done on the virtual machine. For example, the traffic may include browser packets, email packets, etc. Computing system 135 may include one or more scripts used to provision tools in the virtual machine. For example, the computing system 135 may contain monitoring scripts which identify the requested user operations and/or tasks. In some examples, the computing device may then dynamically provide the requested tools or access based on the task and the security policy.

At step 218, computing system 135 detects the end of a remote connection and receives a decommission request. For example, a user may have closed a remote screen session and logged off the VPN. The user may also have returned to the self-service portal and submitted a request for the virtual machine to be decommissioned.

At step 220, computing system 135 saves detected edits to the sensitive information and stops the virtual machine. For example, the system can inspect a local file system on the virtual machine and copies any new documents to the document store, wherein the document may be encrypted. The new documents may reside in an account's "Documents" folder. Computing system 135 may attach the relevant metadata associated with the new documents during the process of copying the new documents. For example, the metadata may include an author who created the documents, a time that a document was modified or created, a task associated with a modified or created document, among other suitable metadata.

At step 222, computing system 135 destroys the virtual machine image. For example, the computing device can destroy the virtual machine image by overwriting the image with randomly generated data and then deleting the image.

The process flow diagram of FIG. 2 is not intended to indicate that the operations of the process 200 are to be executed in any particular order, or that all of the operations of the process 200 are to be included in every case. Additionally, the process 200 can include any suitable number of additional operations.

Figure 3:
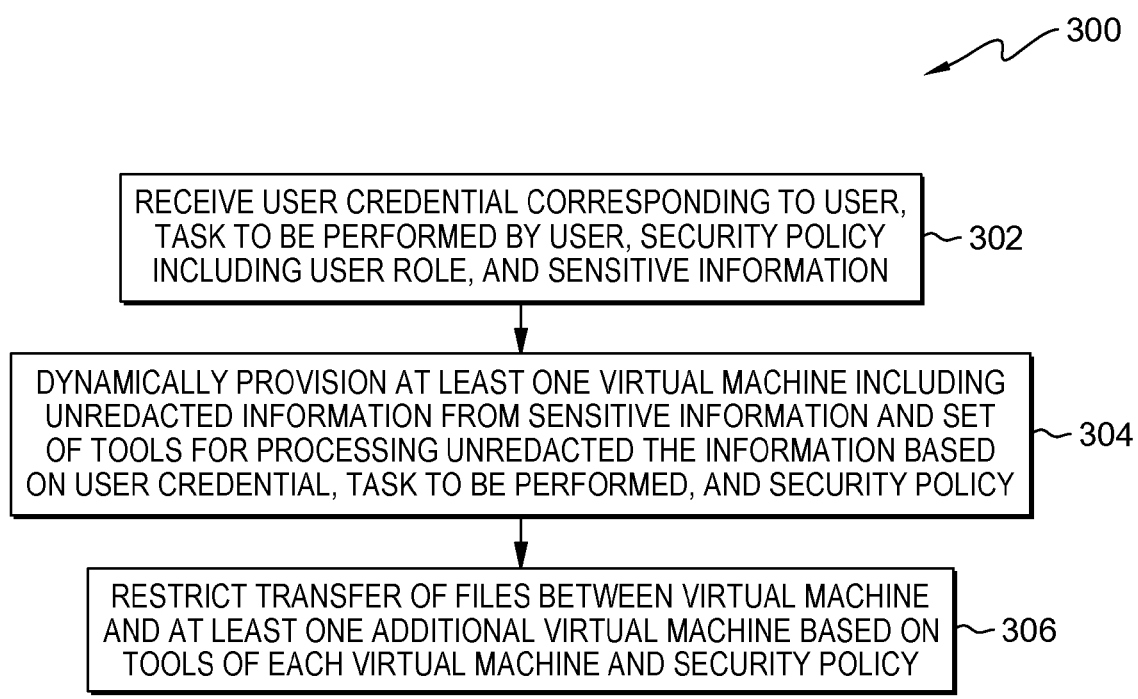
FIG. 3 is a process flow diagram for restricting the transfer of files between at least two virtual machine upon dynamically provisioning virtual machines, in accordance with an embodiment of the present invention.

FIG. 3 is a process flow diagram of an example method for dynamically provisioning virtual machines. Method 300 can be implemented with any suitable computing device, such as the computing device 101 of FIG. 1. For example, method 300 may be implemented via the processor 102 of computing device 101 in conjunction with computing system 135.

The process flow diagram of FIG. 3 is not intended to indicate that the operations of the method 300 are to be executed in any particular order, or that all of the operations of the method 300 are to be included in every case. For example, if one virtual machine is provisioned in step 304, then step 306 may not be performed. Furthermore, in some examples, the masking or redaction of sensitive information can be performed in the middle of a task based on detected user actions. Additionally, the method 300 can include any suitable number of additional operations.

At step 302, computing system 135 receives a user credential corresponding to a user, a task to be performed by the user, a security policy including a user role, and sensitive information. For example, the user may be a doctor to receive a health insurance claim from an insurance provider and perform a task thereon.

At step 304, computing system 135 dynamically provisions at least one virtual machine including un-redacted information from the sensitive information and a set of tools for processing the un-redacted information based on the user credential, the task to be performed, and the security policy. For example, an insurance company may send a healthcare insurance claim to the external doctor, who may use sensitive data and insurance company internal tools in order to perform one or more tasks. Thus, processor 102 in a company's version of computing device 101 may prepare a virtual machine which contains all the data and tools that the doctor needs in order to fulfil the one or more tasks. In one instance, the virtual machine may be dynamically provisioned by using a set of base virtual machine images. For example, the virtual machine base images may include an operating system and a basic configuration. Processor 102 may then clone the base virtual machine image, copy sensitive information, install tools onto the base virtual machine image, and configure the virtual machine image based on the task which a user is to perform. Processor 102 may then provide the configured virtual machine with un-redacted information from the sensitive information and tools to the user.

At step 306, computing system 135 restricts a transfer of files between the virtual machine and the at least one additional virtual machine based on the tools of each virtual machine and the security policy. For example, two or more virtual machines may have been provisioned at step 304. Thus, processor 102 allows files to be transferred between the machines. However, some files may be restricted from being transferred based on the tools of each virtual machine and the security policy. For example, files which are not allowed Internet access may not be allowed to be transferred to virtual machines which have Internet access. In some examples, when the doctor finishes the task, processor 102 may save the report that the doctor created in the company system.

Figure 4:
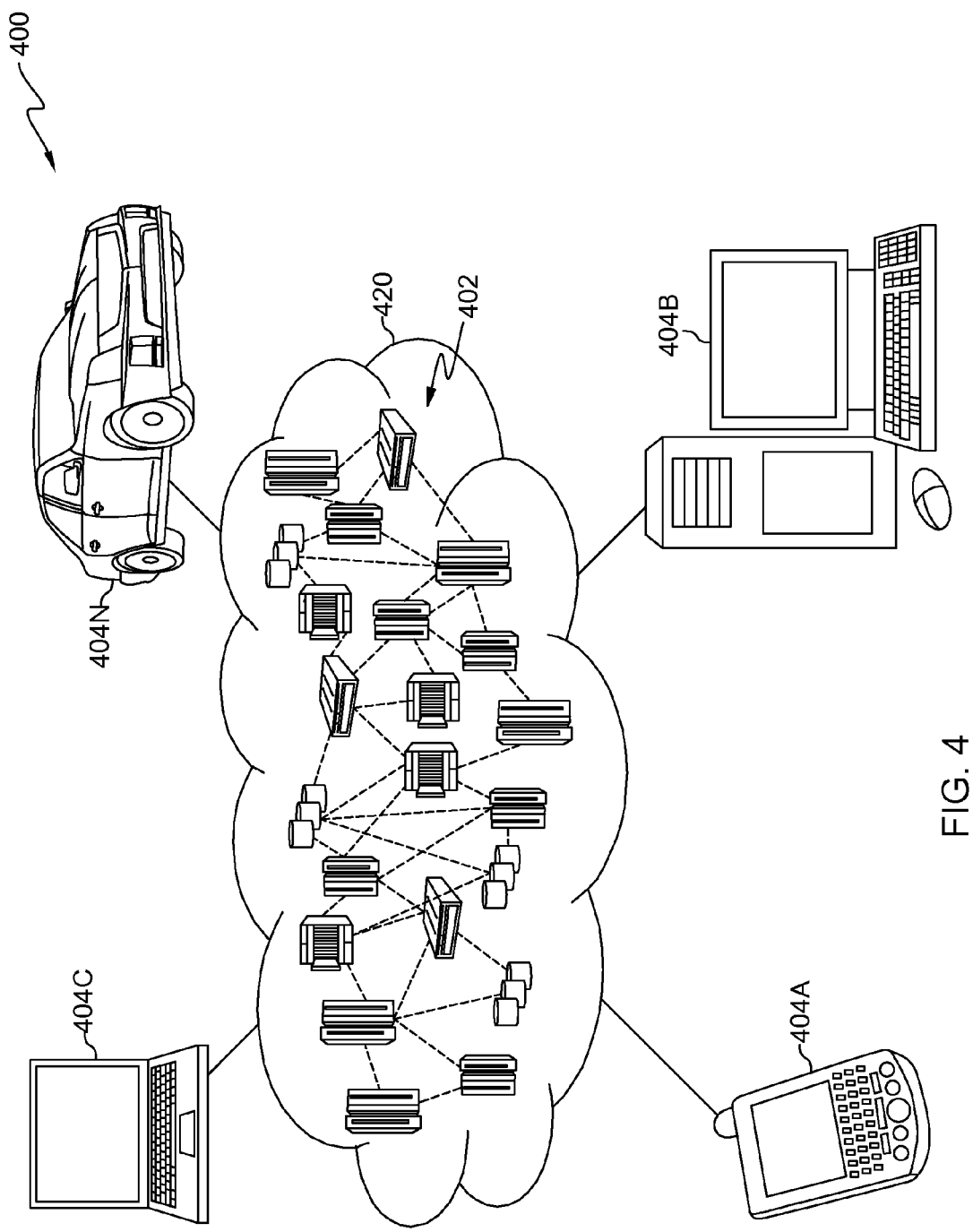
FIG. 4 depicts a cloud computing environment, in accordance with an embodiment of the present invention.

Referring now to FIG. 4, illustrative cloud computing environment 400 is depicted. As shown, cloud computing environment 400 comprises one or more cloud computing nodes 402 with which local computing devices used by cloud consumers, such as, for example, personal digital assistant (PDA) or cellular telephone 404A, desktop computer 404B, laptop computer 404C, and/or automobile computer system 404N may communicate over network 420. Nodes 402 may communicate with one another. They may be grouped (not shown) physically or virtually, in one or more networks, such as Private, Community, Public, or Hybrid clouds as described hereinabove, or a combination thereof. This allows cloud computing environment 400 to offer infrastructure, platforms and/or software as services for which a cloud consumer does not need to maintain resources on a local computing device. It is understood that the types of computing devices 404A-N shown in FIG. 4 are intended to be illustrative only and that computing nodes 402 and cloud computing environment 400 can communicate with any type of computerized device over any type of network and/or network addressable connection (e.g., using a web browser).

Figure 5:
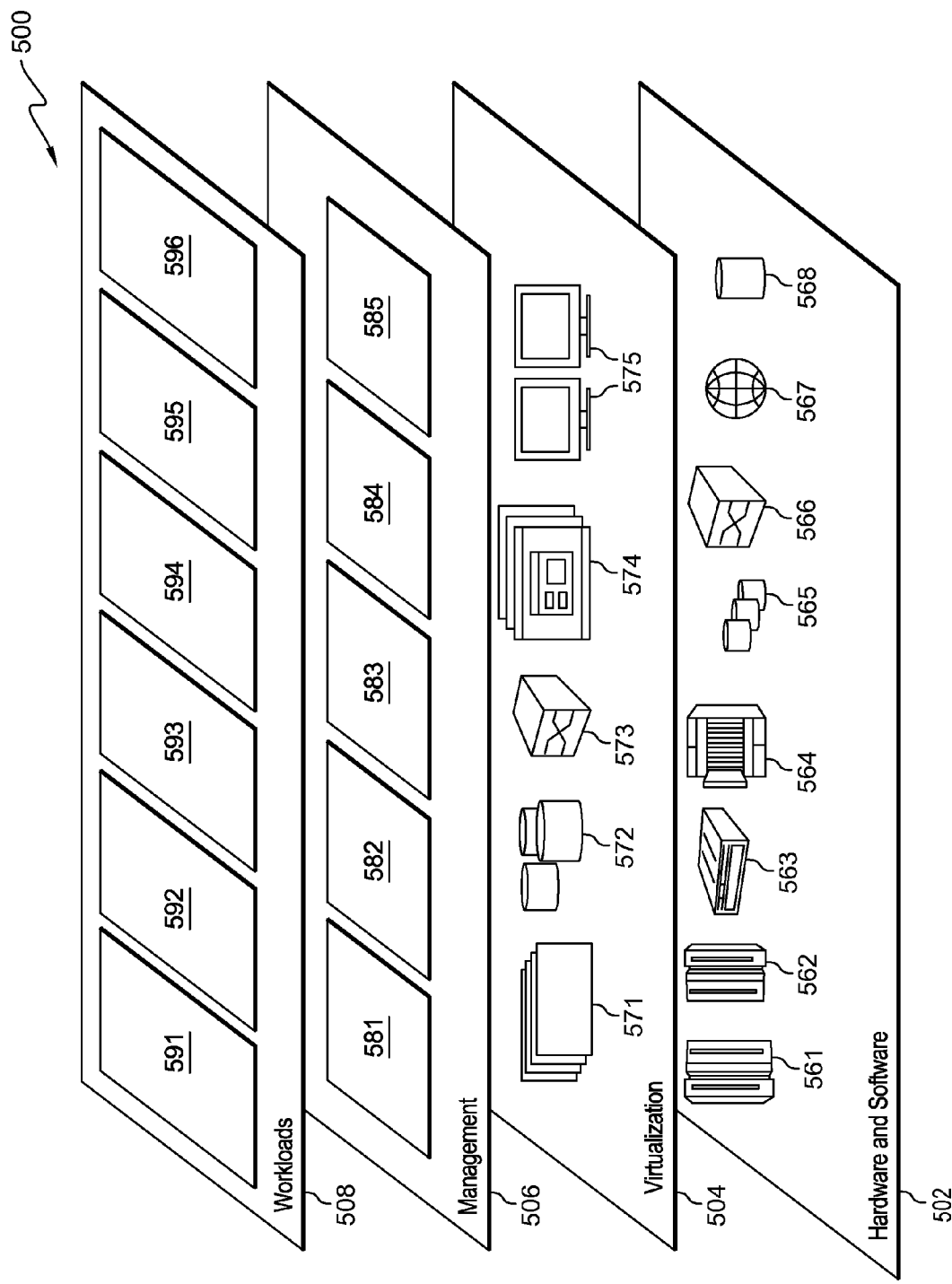
FIG. 5 depicts abstraction model layers, in accordance with an embodiment of the present invention.

Referring now to FIG. 5, a set of functional abstraction layers provided by cloud computing environment 500 (FIG. 5) is shown. It should be understood in advance that the components, layers, and functions shown in FIG. 5 are intended to be illustrative only and embodiments of the invention are not limited thereto. As depicted, the following layers and corresponding functions below are provided.

Hardware and software layer 502 includes hardware and software components. Examples of hardware components include: mainframes 561; RISC (Reduced Instruction Set Computer) architecture based servers 562; servers 563; blade servers 564; storage devices 565; and networks and networking components 566. In some embodiments, software components include network application server software 567 and database software 568.

Virtualization layer 504 provides an abstraction layer from which the following examples of virtual entities may be provided: virtual servers 571; virtual storage 572; virtual networks 573, including virtual private networks; virtual applications and operating systems 574; and virtual clients 575. In one example, management layer 506 may provide the functions described below. Resource provisioning 581 provides dynamic procurement of computing resources and other resources that are utilized to perform tasks within the cloud computing environment. Metering and Pricing 582 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 583 provides access to the cloud computing environment for consumers and system administrators. Service level management 584 provides cloud computing resource allocation and management such that required service levels are met. Service Level Agreement (SLA) planning and fulfillment 585 provides pre-arrangement for, and procurement of, cloud computing resources for which a future requirement is anticipated in accordance with an SLA.

Workloads layer 508 provides examples of functionality for which the cloud computing environment may be utilized. Examples of workloads and functions which may be provided from this layer include: mapping and navigation 591; software development and lifecycle management 592; virtual classroom education delivery 593; data analytics processing 594; transaction processing 595; and sensitive data processing 596.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics of the cloud models are as follows:

On-demand self-service: a cloud consumer can unilaterally provision computing capabilities, such as server time and network storage, as needed automatically without requiring human interaction with the service's provider.

Broad network access: the capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: cloud infrastructure is operated solely for an organization. It may be managed by the organization or a third party and may exist on-premises or off-premises.

Community cloud: cloud infrastructure is shared by several organizations and supports a specific community that has shared concerns (e.g., mission, security requirements, security policy, and compliance considerations). It may be managed by the organizations or a third party and may exist on-premises or off-premises.

Public cloud: cloud infrastructure is made available to the general public or a large industry group and is owned by an organization selling cloud services.

Hybrid cloud: cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure including a network of interconnected nodes.

Figure 6:
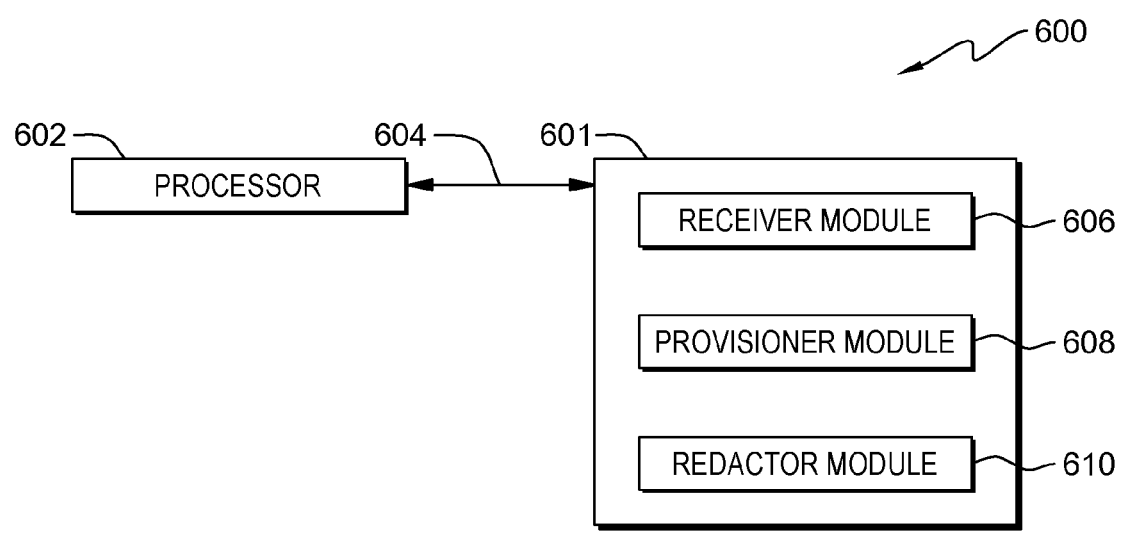
FIG. 6 is an example tangible, non-transitory computer-readable medium which dynamically provisions virtual machines.

Referring now to FIG. 6, a block diagram is depicted of an example tangible, non-transitory computer-readable medium environment 600 which can dynamically provision virtual machines. The tangible, non-transitory, computer-readable medium 601 may be accessed by processor 602 over computer interconnect 604. Furthermore, the tangible, non-transitory, computer-readable medium 601 may include code to direct the processor 602 to perform the operations of the method 300 of FIG. 3 above.

The various software components discussed herein may be stored on the tangible, non-transitory, computer-readable medium 601, as indicated in FIG. 6. For example, receiver module 606 includes code to receive a user credential corresponding to a user, a task to be performed by the user, and a security policy including a user role. Provisioner module 608 also includes code to dynamically provision a virtual machine including un-redacted information from the sensitive information and a set of tools for processing the un-redacted information based on the user credential, the task to be performed, and the security policy. Provisioner module 608 includes code to dynamically provision at least one additional virtual machine and restrict a transfer of files between the virtual machine and the at least one additional virtual machine based on the tools of each virtual machine and the security policy. Provisioner module 608 also includes code to provision a restricted user ID for logging onto the virtual machine. For example, the restricted user ID may be used to restrict access to administrative functionality in the operating system. In some examples, provisioner module 608 also includes code to save actions performed on the virtual machine to a database, stop the virtual machine, and overwrite a virtual machine image corresponding to the virtual machine with randomly generated data. Redactor module 610 includes code to redact portions of sensitive information based on the user credential and the request for sensitive information to generate the un-redacted information. In some examples, the redactor module 610 also includes code to recalculate the un-redacted information in one source of data based on un-redacted information in another source of data to be used in the task. For example, if information is to be used and thus un-redacted for one task, then the same information can be un-redacted for the same user in another task. In some examples, redactor module 610 may redact some sensitive information based on detecting that some other information is un-redacted. For example, some types of sensitive information may not be exposed together, such as in the case of two files, where one file contains a table of user names and their internal ids and one file contains a table with internal ids and social numbers. Although each one of the files may be un-redacted when presented alone, at least one of the files may be redacted when the files are presented together. In some examples, redactor module 610 also includes code to recalculate the un-redacted information based on un-redacted information in another task associated with the user. It is to be understood that any number of additional software components not shown in FIG. 6 may be included within the tangible, non-transitory, computer-readable medium 601, depending on the particular application.

The flowchart and block diagrams in the Figures illustrate the architecture, functionality, and operation of possible implementations of systems, methods, and computer program products according to various embodiments of the present techniques. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present techniques have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present techniques may be a system, a method or computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present techniques may be assembler instructions, instruction-set-architecture (ISA) instructions, machine instructions, machine dependent instructions, microcode, firmware instructions, state-setting data, or either code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present techniques.

Aspects of the present techniques are described herein with reference to flowchart illustrations and/or block diagrams of methods, apparatus (systems), and computer program products according to embodiments of the techniques. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

What is claimed is:

1. A computer-implemented method for provisioning the plurality of virtual machines, comprising:
   receiving, by one or more processors, a user credential corresponding to a user, a task to be performed by the user, a security policy comprising a user role, and sensitive information;
   dynamically provisioning, by one or more processors, a virtual machine among the plurality of virtual machines using a plurality of virtual machine images, wherein the virtual machine contains un-redacted information from the sensitive information and a set of tools for processing the un-redacted information based on the user credential, the task to be performed, and the security policy;
   randomly generating, by one or more processors, data associated with the virtual machine; and
   preventing, by one or more processors, unauthorized access from a restricted user ID to the sensitive information, by using the randomly generated data associated with the virtual machine and a plurality of local proxies in the virtual machine;
   detecting, by one or more processors, a plurality of edits to the sensitive information;
   responsive to detecting the plurality, of edits to the sensitive information, ceasing, by one or more processors, operations of the virtual machine; and
   responsive to ceasing the operations of the virtual machine, destroying, by one or more processors, a respective virtual machine image corresponding to the randomly generated data associated with the virtual machine.

2. The computer-implemented method of claim 1, further comprising:
   dynamically provisioning, by one or more processors, at least one additional virtual machine to the virtual machine and restricting a transfer of files between the virtual machine and the at least one additional virtual machine, based on the tools of each virtual machine and the security policy.

3. The computer-implemented method of claim 1, further comprising:
   redacting, by one or more processors, portions of the sensitive information based on the user credential and the task to generate the un-redacted information.

4. The computer-implemented method of claim 3, further comprising:
   recalculating, by the one or more processors, the un-redacted information in one source of data based on un-redacted information in another source of data to be used in order to perform a task.

5. The computer-implemented method of claim 3, further comprising:
recalculating, by one or more processors, the un-redacted information based on un-redacted information in another task associated with a user.

6. The computer-implemented method of claim 1, further comprising:
provisioning, by one or more processors, the restricted user ID for logging onto the virtual machine.

7. A computer system for dynamically provisioning a plurality of virtual machines, comprising:
one or more computer processors;
one or more computer readable storage media;
program instructions stored on the computer readable storage media for execution by at least one of the one or more processors, the program instructions comprising:
program instructions to receive a user credential corresponding to a user, a task to be performed by the user, a security policy comprising a user role, and sensitive information;
program instructions to dynamically provision a virtual machine among the plurality of virtual machines using a plurality of virtual machine images, wherein the virtual machine contains un-redacted information from the sensitive information and a set of tools for processing the un-redacted information based on the user credential, the task to be performed, and the security policy;
program instructions to randomly generate data associated with the virtual machine; and
program instructions to prevent unauthorized access from a restricted user ID to the sensitive information, by using the randomly generated data associated with the virtual machine and a plurality of local proxies in the virtual machine;
program instructions to detect a plurality of edits to the sensitive information:
responsive to detecting the plurality of edits to the sensitive information, program instructions to cease operations of the virtual machine; and
responsive to ceasing the operations of the virtual machines, program instructions to destroy a respective virtual machine image corresponding to the randomly generated data associated with the virtual machine.

8. The computer system of claim 7, further comprising:
program instructions to dynamically provision at least one additional virtual machine to the virtual machine and restricting a transfer of files between the virtual machine and the at least one additional virtual machine, based on the tools of each virtual machine and the security policy.

9. The computer system of claim 7, further comprising:
program instructions to redact portions of the sensitive information based on the user credential and the task to generate the un-redacted information.

10. The computer system of claim 9, further comprising:
program instructions to recalculate the un-redacted information in one source of data based on un-redacted information in another source of data to be used in order to perform a task.

11. The computer system of claim 9, further comprising:
program instructions to recalculate the un-redacted information based on un-redacted information in another task associated with a user.

12. The computer system of claim 8, further comprising:
program instructions to provision the restricted user ID for logging onto the virtual machine.

13. A computer program product for dynamically provisioning a plurality of virtual machines comprises:
one or more computer readable storage medium and program instructions stored on the one or more computer readable storage medium, the program instructions comprising:
program instructions to receive a user credential corresponding to a user, a task to be performed by the user, a security policy comprising a user role, and sensitive information;
program instructions to dynamically provision a virtual machine among the plurality of virtual machines using a plurality of virtual machine images, wherein the virtual machine contains un-redacted information from the sensitive information and a set of tools for processing the un-redacted information based on the user credential, the task to be performed, and the security policy;
program instructions to randomly generate data associated with the virtual machine; and
program instructions to prevent unauthorized access from a restricted user ID to the sensitive information, by using the randomly generated data associated with the virtual machine and a plurality of local proxies in the virtual machine;
program instructions to detect a plurality of edits to the sensitive information:
responsive to detecting the plurality of edits to the sensitive information, program instructions to cease operations of the virtual machine; and
responsive to ceasing the operations of the virtual machine, program instructions to destroy
a respective virtual machine image corresponding to the randomly generated data associated with the virtual machine.

14. The computer program product of claim 13, further comprising:
program instructions to dynamically provision at least one additional virtual machine to the virtual machine and restricting a transfer of files between the virtual machine and the at least one additional virtual machine, based on the tools of each virtual machine and the security policy.

15. The computer program product of claim 13, further comprising:
program instructions to redact portions of the sensitive information based on the user credential and the task to generate the un-redacted information.

16. The computer program product of claim 15, further comprising:
program instructions to recalculate the un-redacted information in one source of data based on un-redacted information in another source of data to be used in order to perform a task.

17. The computer program product of claim 15, further comprising:
program instructions to recalculate the un-redacted information based on un-redacted information in another task associated with a user.

* * * * *